United States Patent [19]

Overholt

[11] Patent Number: 4,975,731
[45] Date of Patent: Dec. 4, 1990

[54] APPARATUS FOR PRODUCING A FORM HAVING DRIVER'S LICENSE INFORMATION THEREON

[76] Inventor: Sanford Overholt, Box 84T, Rte. 6, Newport, Tenn. 37821

[21] Appl. No.: 237,752

[22] Filed: Aug. 26, 1988

[51] Int. Cl.⁵ .............................................. G03B 27/62
[52] U.S. Cl. ......................................... 355/40; 355/75
[58] Field of Search ............................. 355/40, 77, 75

[56] References Cited

U.S. PATENT DOCUMENTS

| | | | |
|---|---|---|---|
| 3,571,957 | 3/1971 | Cumming et al. | 355/40 X |
| 3,612,684 | 10/1971 | Jones et al. | 355/40 |
| 3,913,118 | 10/1975 | Abrams | 354/292 |
| 4,707,121 | 11/1987 | Sawaki et al. | 355/40 |

Primary Examiner—Donald A. Griffin
Attorney, Agent, or Firm—Pitts and Brittian

[57] ABSTRACT

Appartus for formatting the layout of information from one face of a driver's license (34) on or proximate the platen (15) of a copying machine (12) having an input form (14) which is fed into the machine (12). The apparatus includes a member which holds the driver's license (34) at a preselected location on or proximate the platen (15) for copying. The input form (14) is fed into the copying machine (12) at a selected orientation which allows information on the face of the driver's license (34) to be copied onto the input form (14) to produce a final or new form (18) that is output from the machine (12). This final form (18) has the driver's license information copied thereon at a selected location. The apparatus is particularly suitable for use in connection with guest registration in motels, or other applications, where it is desirable to have the driver's license information on a specialized business form.

1 Claim, 3 Drawing Sheets

APPARATUS FOR PRODUCING A FORM HAVING DRIVER'S LICENSE INFORMATION THEREON

DESCRIPTION

1. Technical Field

This invention relates generally to apparatus for producing forms, and more particularly concerns apparatus which allows for formatting the layout of information on one face of a driver's license on the platen of a copy machine to produce a form having such information at a selected location thereon.

2. Background Art

During various registration activities, it is necessary or desired for information contained on a face of a registrant's driver's license to be transferred onto a particular business form. For example, when a guest registers in a motel, the owner needs driver's license information on the motel form for identification and record keeping purposes. Transferring such driver's license information to a particular business form requires substantial time and effort on the part of the clerk and/or guest. The time required can cause annoyances to other guests waiting in line and can also result in the recording of misinformation due to human error. It is also noted that information contained on a driver's license may be needed by leasing firms, movie rental firms, tool rental firms, check cashing institutions, insurance companies, police departments and other law enforcement agencies. Known devices relating to the field of the present invention are U.S. Pat. Nos. 3,913,118 and 4,707,121.

The main purpose of the present invention is to provide apparatus for readily producing a form having driver's license information thereon at a selected location.

Another object of the present invention is to provide such a device and method which can be operated easily and quickly by an unskilled worker.

DISCLOSURE OF THE INVENTION

Other objects and advantages will be obvious, and will in part appear hereinafter, and will be accomplished by the present invention which provides apparatus operatively associated with a copying machine for formatting the layout of information on one face of a driver's license on the platen of a copying machine. The apparatus includes a means for holding the driver's license at a selected location on the platen. A device is also provided for holding an input form at a selected location such that it is fed into and processed by the copying machine. Information on the face of the driver's license is copied onto the input form at a selected location to produce a new form which is output from the machine with the driver's license information thereon at a desired location.

BRIEF DESCRIPTION OF THE DRAWINGS

The above-mentioned features of the present invention will be more clearly understood from consideration of the following description in connection with the accompanying drawings in which.

BEST MODE FOR CARRYING OUT THE INVENTION

Figure 1:
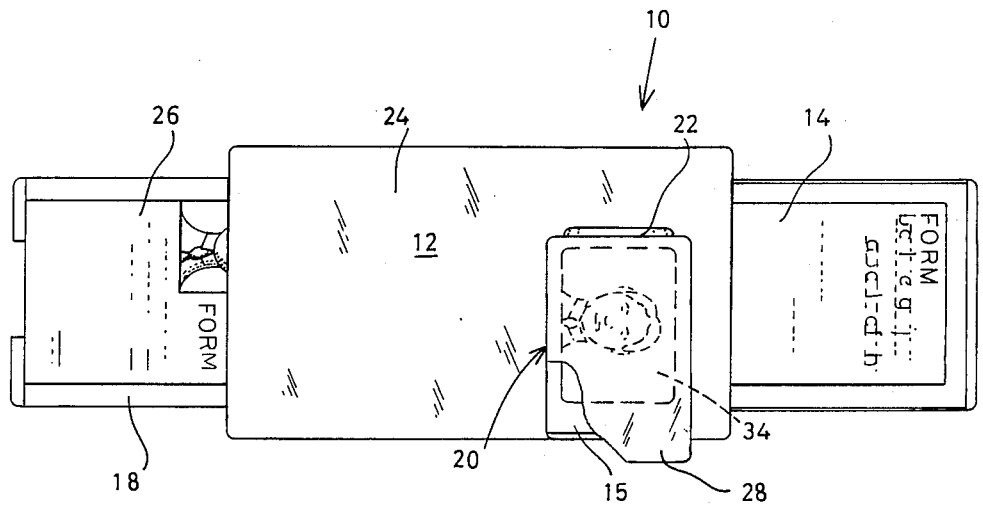
FIG. 1 is a plan view of an apparatus constructed in with various features of the present invention.

Referring now to the figures, an apparatus operatively associated with a copying machine and constructed in accordance with various features of the present invention is generally indicated at 10 in the figures. More specifically, a copying machine using conventional copying technology is generally indicated at 12 in the figures. This copying machine 12 includes a platen 15 (See FIGS. 1 and 3) upon which documents to be copied are placed. Documents placed on or proximate the platen are processed by the copying machine such that they are copied onto paper or forms 14 usually held (unless they are hand fed) in an input tray 16 positioned for feeding such forms 14 into the copying machine 12. Documents processed by the copying machine 12 are output into an output tray 18 which collects the newly produced forms.

As indicated generally hereinabove, there are numerous business registration and data collection activities that require the transformation of information contained on a driver's license to a standard business form for registration and other record keeping purposes. For example, it is desirable for a motel owner to collect information on a guest's driver's license not only for record keeping purposes but to dissuade a guest from taking items which may not belong to him. If the guest having such propensities is aware that the desk clerk not only has all information on one face of his driver's license printed on his registration form, but also has a facsimile of a photograph of the guest (where photographs are used on driver's license) it is likely that fewer articles will be removed from the hotel rooms. To this end, the apparatus of the present invention is designed to quickly and accurately transfer information from a driver's license to a business form. While a regular copying machine could be used in this regard, it is important for purposes of this invention that the newly produced form has the driver's license information systematically formatted onto the business form. It is to this end that a conventional copier and/or copier techniques are modified such that an unskilled worker can readily produce a new form having driver's license information formatted and copied thereon.

In the embodiment illustrated in FIG. 1, the coping machine 12 includes a platen located below the cover 20. This cover 20 is dimensioned such that it receives a conventional driver's license 34 thereunder as shown in FIG. 1. Moreover, the surface of the platen accessible to the operator by lifting the cover 20, is limited such that the copied license appears at the selected and proper location on the form 14, as will be described in greater detail below. Moreover, the cover 20 is hinged proximate its rear portion 22 to an upper portion 24 of the copying machine 12. The location of the cover with respect to the platen and to the orientation of forms 14 held in the input tray is preselected. This orientation is designed such that when a driver's license is placed under the cover 20 on the copying machine platen 15, the new form 26 which is discharged into the output tray 18 in the illustrated embodiment includes preselected information thereon which was already contained on the form 14 together with information from one face of the driver's license. The driver's license information and the original information on the form 14 is arranged in a predetermined layout for record keeping and organizational purposes. In order to facilitate lifting the cover 20, a suitable handle member 28 is provided thereon. This handle member extends outwardly from the upper portion 24 of the copying machine 12 as is illustrated in FIG. 1 and facilitates a users operation of the cover for placement of the driver's license at the proper orientation for copying.

Figure 2:
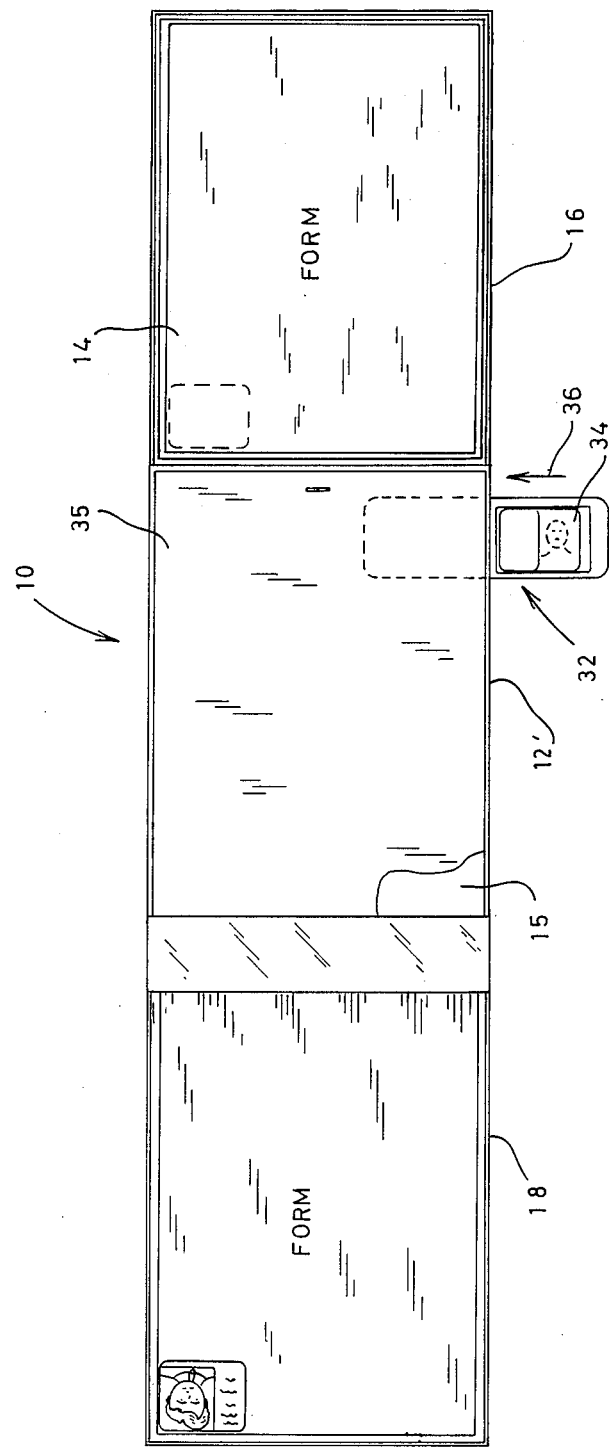
FIG. 2 is a plan view of an alternate embodiment of an apparatus for producing a new form from a copying machine having driver's license information thereon at a selected location.
Figure 3:
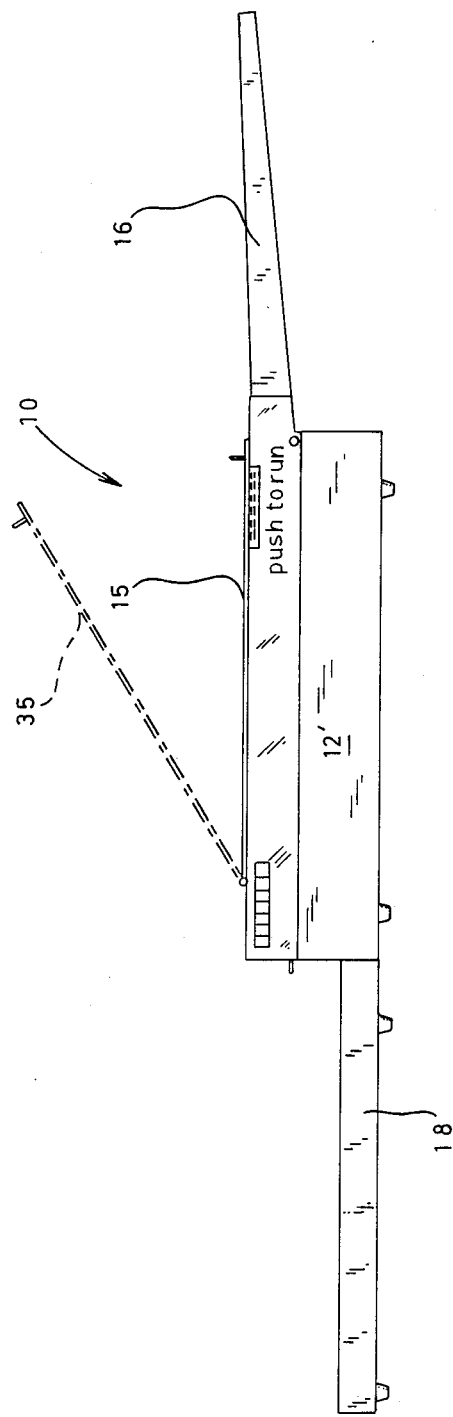
FIG. 3 is a side elevation view of the apparatus shown in FIG. 2.

An alternate embodiment of apparatus operatively associated with a copying machine for producing a form having driver's license information contained thereon in a selected format with other information is illustrated in FIGS. 2 and 3. More specifically, FIG. 2 illustrates apparatus 32 which is designed for receiving a driver's license therein. Upon placement of a driver's license 34 into the sliding apparatus 32, this device is pushed in the direction of arrow 36 to move the driver's license 34 into proper orientation with respect to the platen 15 on, or proximate, which documents to be copied are placed. Thus, the apparatus 32 receives a license therein and slides it into place with respect to the platen of the copying machine 12 such that information contained on the driver's license is copied and arranged in a predetermined layout with respect to other information contained on input forms 14. The new forms produced by the apparatus illustrated in FIGS. 2 and 3 are output into an output tray 18 for collection. It will be noted in FIG. 3 that the door 35 of the copying machine 12' is pivotally mounted on the upper portion of the copying machine and is of conventional design.

Figure 4:
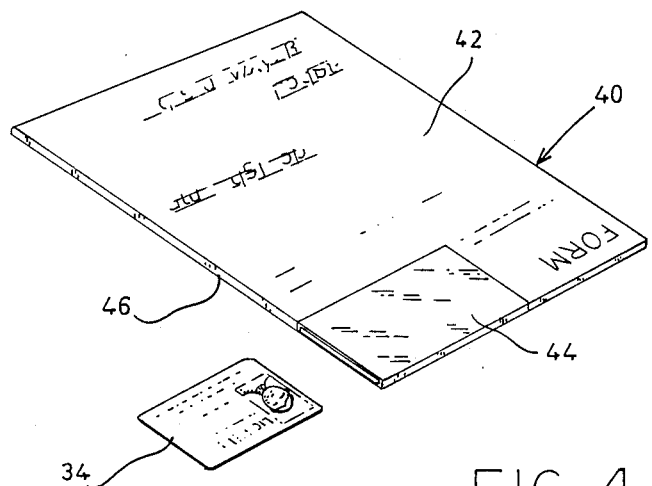
FIG. 4 illustrates a device for being processed through a copying machine and for formatting a new form produced at the machine output having driver's license information thereon at a selected location.

FIG. 4 illustrates an apparatus for being processed through a copying machine to format a form produced at the output of the copying machine which includes preselected information indicated on the face 42 of the apparatus 40 together with information contained on one face of a driver's license 34. In this regard, the apparatus comprises a substantially rectangular member illustrated in FIG. 4 which is dimensioned for being copied by a conventional copying machine. Means generally indicated at 44 serve to hold a driver's license 34 as the rectangular member is copied on the copying machine. In this manner, a new form is produced at the output of the copying machine which includes the preselected information printed on the form together with information on one face of the driver's license 34. In this regard, the means 44 defines an edge 46 provided with a slot 48 for slidably receiving the driver's license 34 as illustrated in FIG. 4, and is substantially clear or translucent to allow copying therethrough. Moreover, it will be noted that the upper surface 46 of the apparatus 40 is substantially coplanar such that a clean and crisp copy of the driver's license face is transferred thereto since this face is proximate the level of form information contained on the apparatus 40. It will also be recognized that apparatus 40 could be used to orient the driver's license on the platen such that it is copied at a desired location on a form input into a copying machine rather than having the form information on the face 42 of apparatus 40.

From the foregoing detailed description, it will be recognized by those skilled in the art that an improved apparatus operatively associated with a conventional copying machine has been provided which is designed to produce a business form which includes preselected information together with information from one face of a driver's license arranged in a predetermined layout. This apparatus is designed such that information on a driver's license can be readily and accurately produced for record keeping purposes by a business establishment.

Embodiments shown and described herein are given only for purposes of illustration and are not intended as limitations on the invention. Accordingly, the invention is to be limited only by the appended claims and their equivalents.

I claim:

1. A copying machine for receiving a form having a preselected area for the insertion of driver's license information and for copying driver's license information onto said preselected area of said form, said copying machine comprising:

a housing having a side portion;

copying means within said housing;

input means for inputting said form to said copying means;

a platen operatively associated with said copying means upon which printed matter is placed for copying by said copying means;

an access opening provided in said side portion of said housing;

a sliding apparatus for receiving said driver's license therein and for being slidably received into said access opening so as to orient said driver's license with respect to said platen such that said copying means serves to copy said driver's license information onto said preselected area of said form; and output means for removing said form from said copying machine subsequent to said driver's license information being copied to said selected area of said form.

* * * * *